APPARATUS FOR MAKING WIRE SCRIBED CIRCUIT BOARDS

Filed Oct. 9, 1969 7 Sheets-Sheet 1

INVENTORS:
RAYMOND J. KEOGH
FRANK J. WILCZEK
BY

MORGAN, FINNEGAN,
DURHAM & PINE
ATTORNEYS

APPARATUS FOR MAKING WIRE SCRIBED CIRCUIT BOARDS

Filed Oct. 9, 1969 7 Sheets-Sheet 2

INVENTORS:
RAYMOND J. KEOGH
FRANK J. WILCZEK
BY
MORGAN, FINNEGAN
DURHAM & PINE
ATTORNEYS

INVENTORS:
RAYMOND J. KEOGH
BY FRANK J. WILCZEK

MORGAN, FINNEGAN,
DURHAM & PINE
ATTORNEYS

APPARATUS FOR MAKING WIRE SCRIBED CIRCUIT BOARDS

INVENTORS:
RAYMOND J. KEOGH
FRANK J. WILCZEK
BY
MORGAN, FINNEGAN
DURHAM & PINE
ATTORNEYS

INVENTORS:
RAYMOND J. KEOGH
FRANK J. WILCZEK
BY
MORGAN, FINNEGAN,
DURHAM & PINE
ATTORNEYS

APPARATUS FOR MAKING WIRE SCRIBED CIRCUIT BOARDS

Filed Oct. 9, 1969 7 Sheets-Sheet 6

INVENTORS:
RAYMOND J. KEOGH
FRANK J. WILCZEK

BY

MORGAN, FINNEGAN,
DURHAM & PINE
ATTORNEY

INVENTORS:
RAYMOND J. KEOGH
FRANK J. WILCZEK
BY
MORGAN, FINNEGAN,
DURHAM & PINE
ATTORNEYS 3,674,602

APPARATUS FOR MAKING WIRE SCRIBED CIRCUIT BOARDS

Raymond J. Keogh, Huntington, and Frank J. Wilczek, Glen Oaks, N.Y., assignors to Photocircuits Corporation, Glen Cove, N.Y.

Filed Oct. 9, 1969, Ser. No. 865,008
Int. Cl. B29c *19/02*
U.S. Cl. 156—380 11 Claims

ABSTRACT OF THE DISCLOSURE

A technique and apparatus for making wired interconnection boards for electrical components. The insulated wire pattern is formed by tacking the wire on an adhesive coated dielectric base using a tacking head having a bifurcated end arranged to heat and partially cure the adhesive and to mold the adhesive so it physically captures the wire. The tacking head is associated with a cutter and initial wire feed mechanism. The tacking head and associated apparatus can be oriented in any one of four directions while the dielectric base is moved on a table which has two degrees of freedom.

After the conductor pattern is formed on the dielectric base, the conductor pattern is permanently secured by lamination encapsulation or the like so that the conductors are interior of the board. Holes are drilled so that the conductor ends form part of the hole walls and the holes are then metallized to bring the conductor terminations to the surface.

CROSS-REFERENCE TO RELATED APPLICATIONS

This application includes subject matter related to copending applications, Ser. No. 628,701, filed Apr. 5, 1967 in the name of Robert Page Burr, entitled Electric Wiring Assemblies and Ser. No. 704,383, filed Feb. 9, 1969 in the name of Robert Page Burr and entitled Electric Wiring Assemblies. The copending applications have a common assignee with this application and are incorporated herein by reference.

BACKGROUND OF THE INVENTION

This invention relates to a technique for making wired circuit boards for interconnecting electrical components and apparatus for making the same.

In recent years a variety of printed circuit techniques have been developed to provide printed circuit interconnection structures for electrical components. With the printed circuit techniques, art work in one form or another must be created which accurately and precisely defines the desired conductor pattern in one or more conductor layers. The art work is used to either define the area upon which copper is to be deposited or the area on a copper laminate where copper should not be removed during a subsequent etching operation. These techniques provide a vast improvement over prior point-to-point wiring techniques, particularly for large volume production. For small production runs, however, the art work and related steps in the printed circuit process, become prohibitively expensive and, therefore, the printed circuit techniques cannot be used economically.

With the advance of integrated circuits and miniaturizing techniques, the density of interconnections in the printed circuit board has increased considerably, often requiring multilayer printed circuit boards. As a result, it is often necessary to use computers to determine the most effective conductor pattern using as few conductor layers as possible. These factors add to the setup costs making it impossible to use printed circuit techniques on small production runs of high density interconnection boards.

An object of this invention is to provide a technique and apparatus for constructing interconnection boards efficiently on small and moderate sized production runs.

Another object is to provide a technique and apparatus wherein a dense interconnection pattern can be achieved in a smaller number of layers and in a less complicated fashion than exists with respect to present day multilayer printed circuit boards.

BRIEF SUMMARY OF THE INVENTION

In accordance with the invention, the interconnection pattern is formed using relaively fine insulated wire. The insulated wire conductors are tacked to the surface of a suitable dielectric base material according to the desired pattern interconnecting selected points on the board. Since the conductors are insulated, the conductors can cross one another as desired and therefore a high density conductor pattern can be achieved in a single layer. Once the conductors have been tacked in place to form the conductor pattern, the conductors are permanently bonded to the dielectric base. Holes are thereafter drilled in the board and located at points corresponding to the ends of the insulated wire conductors so that the exposed ends of the conductors become part of the walls of the holes. The holes are then metallized to bring the conductor terminations to the surface of the interconnection board or, if the board includes several layers of conductors, the metallized holes may be utilized to interconnect conductors in different layers.

The dielectric base material is procoated with an adhesive layer which can be partially cured epoxy resin. The conductor pattern is formed by tacking insulated wire to the adhesive surface by means of a tacking head which locally heats the adhesive, thereby further partially curing the resin to provide an adhesive bond between the wire and the base. The tacking head includes a bifurcated end which straddles the wire and, when a tack is being formed, is driven into the adhesive to force the adhesive up and around the wire. The adhesive material therefore captures the wire and, hence, the tack is achieved by means of both the mechanical capturing and the adhesive bonding.

The base material is mounted on a movable table having two degrees of freedom. The tacking head is mounted so that it can be faced in any one of four directions. Associated with the tacking head are a cutter which cuts off the wire at the end of a conductor run and an initial wire feed which pushes the wire under the tacking head at the beginning of a new run. After an initial tack is formed, movement of the table draws the wire beneath the tacking head which then tacks the wire to the base according to a predetermined pattern.

BRIEF DESCRIPTION OF THE DRAWINGS

The manner in which the foregoing and other objects according to the invention are achieved is set forth in the following detailed description of several illustrative embodiments. The drawings form part of the specification wherein.

DETAILED DESCRIPTION

Figure 1A:
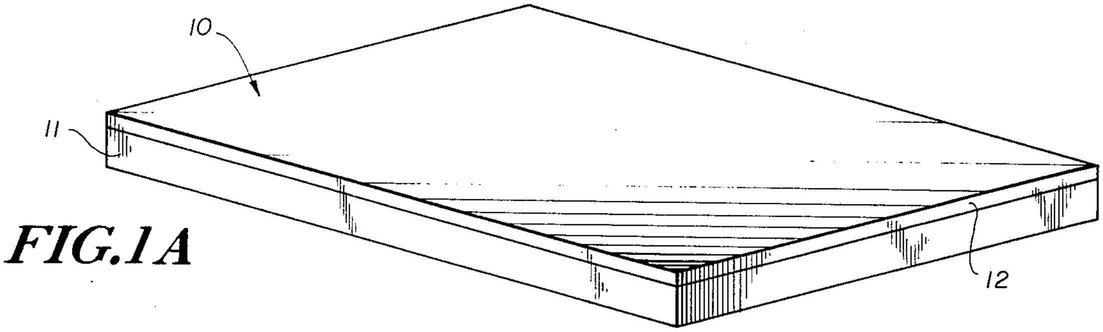
FIGS. 1A–1E are diagrams illustrating the step-by-step formation of the wired circuit board.

The insulated wire interconnection pattern is formed on the surface of a substrate as shown in FIG. 1A which consists of a dielectric base 11 coated with an adhesive layer 12. The adhesive layer is preferably in the form of a partially cured thermosetting resin which becomes malleable upon the application of heat and also provides an adhesive bond when heated momentarily. Details as to particular base materials and thermosetting resins which are suitable for formation of a substrate 10 are described in more detail in the aforementioned copending applications.

Figure 1B:
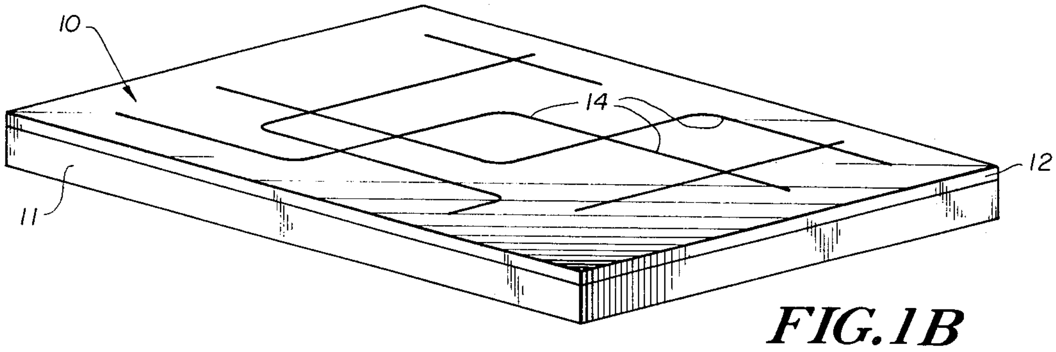

Insulated wire 14 is tacked to the surface of the substrate to thereby form the conductor pattern as is shown in FIG. 1B. This can be achieved by periodically tacking the insulated wire conductors to the substrate as the wire is dispensed following a predetermined pattern or by means of a more continuous tacking bond that couples the insulated wire to the substrate throughout most of the conductor length. The temporary bond can be achieved by locally heating the thermosetting resin to cure or partially cure the resin beneath the conductor to thereby provide an adhesive bond. The temporary bond can also be achieved by heating the thermosetting resin to a malleable state and then molding the resin up and around the conductor to thereby at least partially capture the wire. Advantageously, both physical and adhesive bonding can be used to tack the wire 14 to substrate 10.

Since the conductors of the conductor pattern are insulated, they can be crossed as often as desired in the formation of the conductor pattern. As a result, an extremely dense conductor pattern can be achieved in a single layer. In most cases sufficient interconnections can be provided in a single layer of conductors but, if additional interconnections are required, a multilayer interconnection board can easily be constructed according to the teachings of this invention by using both sides of the board or by laminating several boards together.

Figure 1C:
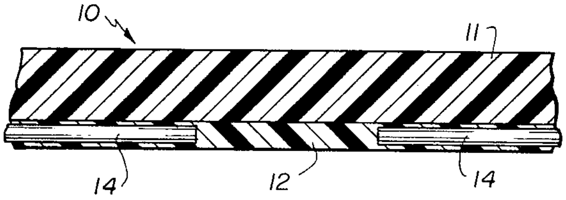

After the conductor pattern is completed, it is permanently bonded to the substrate. This can be accomplished by pressnig the conductor pattern into the substrate i.e., into the thermosetting resin layer 12, and by then applying the appropriate heat and pressure to fully cure the thermosetting resin. An alternative technique would be to laminate the substrate by addition of a second base layer so that when the two layers are bonded to form the laminate the thermosetting resin layer 12 and the conductors are interior of the completed interconnection board structure. An interconnection board wherein the conductors 14 are permanently bonded by pressing the conductors into the thermosetting resin layer 12 is shown in FIG. 1C.

Figure 1D:
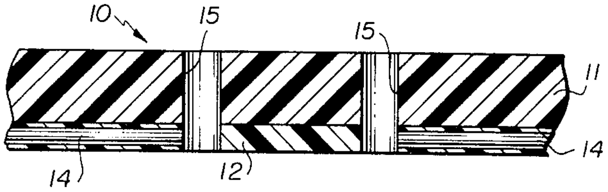

Holes are then drilled into the connection board at locations corresponding to the ends of the individual conductors so that the exposed ends of the conductors become part of the hole walls. As shown in FIG. 1D, the ends of the conductors 14 become part of the walls of the holes 15 drilled through the interconnection board.

Figure 1E:
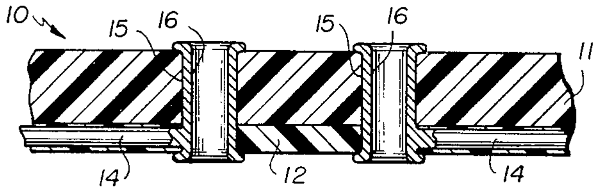

After the holes have been drilled the holes are metalized to provide metalized coatings 16 which bring the conductor terminations to the surface, as shown in FIG. 1E. The metalizing of the holes can be achieved by treating the base and adhesive layers to render them catalytic by dispersing metal particles throughout to thereby render the surfaces receptive to electroless metal deposition. When the interconnection board is immersed in an electroless plating solution, the electroless metal deposits around the metal particles in the exposed interior surfaces of the hole to build up a coating of the desired thickness.

A preferable technique, however, is to first place a mask on the surface of the interconnection board and then dip the interconnection board into a strong cleaning solution after the holes have been drilled to make sure that the ends of the conductors are not contaminated and to provide a clean metal surface which will make proper contact with the interior metalized surface of the hole. After the interconnection board has been cleaned, the board is immersed in a solution which will seed and sensitize the interior of the holes to render them responsive to electroless metal depositing. Thereafter, the board is dipped in an electroless metal solution so that a metallic coating is developed on the interior of the holes. The mask is removed and additional plating up to the desired thickness may follow.

Figures 2, 3:
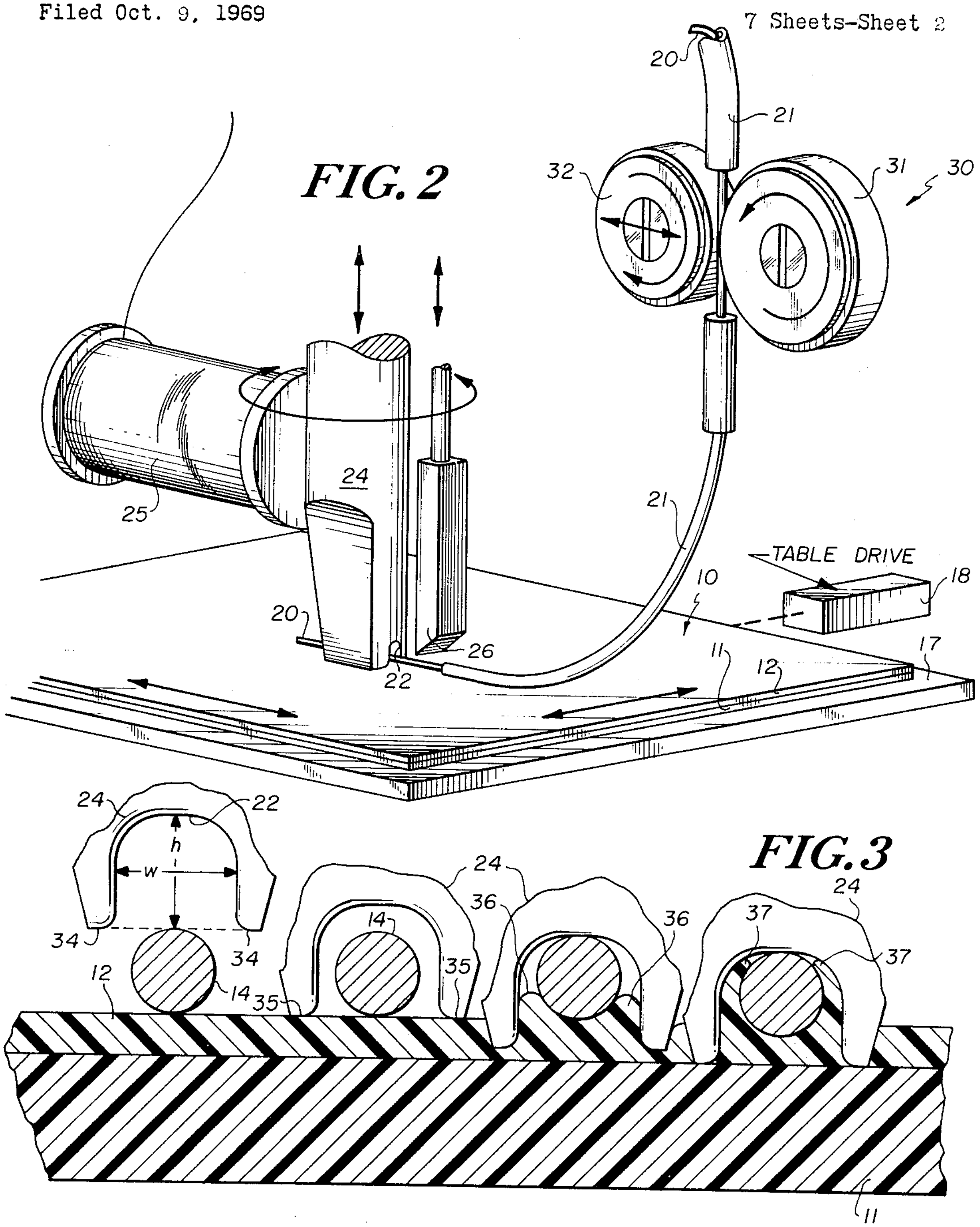
FIG. 2 is a simplified perspective illustration of the tacking apparatus.
FIG. 3 is a progressive illustration of the tack formation.

The basic components of the apparatus for forming the conductor pattern by dispensing insulated wire and tacking the wire to the substrate 10 are shown in FIG. 2.

The substrate 10 is mounted on a movable table 17 controlled by a table drive 18 having two degrees of freedom. The board can therefore be moved incrementally in any one four directions as controlled accurately by movement of the table according to a predetermined program coordinated with the movements of the tacking apparatus shown in FIG. 2.

The insulated wire 20 passes through a wire guide 21 so that the wire emerges from the guide and passes beneath a U-shaped opening 22 of a tacking head 24. The tacking head is shown in a retracted position but is forced downwardly when it is desired to tack the wire to the substrate. A heating coil 25 is thermally coupled to the tacking head and maintains the tacking head at a temperature sufficient (1) to partially cure the thermosetting resin coating 12 of the substrate 10 and (2) to heat the resin coating sufficient to place it in a malleable state so that it can be molded to at least partially capture the wire.

A cutter 26 located adjacent the tacking head, between the tacking head and the end of wire guide 21. The cutter can have a chisel like shape and is attached to apparatus which controls the up and down motion. The cutter is shown in the retracted position but, at the end of a conductor run, the cutter is actuated downwardly against the board so the wire is cut just beyond the last tack of a particular conductor run.

To begin a new conductor run it is necessary to advance the wire so that the end of the wire is beneath the tacking head. This is achieved by an initial wire feed mechanism 30 which includes the rollers 31 and 32. Roller 32 is urged toward roller 31 to engage the wire and the rollers are then rotated a fraction of a revolution just sufficient to advance the wire the desired amount. Thereafter, the roller 32 moves away from the wire so that the wire can feed freely through the wire guide.

Once the end of the wire is positioned beneath the tacking head by the initial wire advance mechanism, it can be tacked to the substrate by tacking head 24. Thereafter, movement of the table draws the wire through the wire guide and the wire is periodically tacked to the substrate by the tacking head. Right angle bends are formed in a conductor run by tacking the wire, rotating the tacking assembly 90 degrees, and by then advancing table 17 in a new direction.

The U-shaped opening of the tacking head is dimensoined having a height *h* as shown in FIG. 3 which is somewhat less than the diameter of the wire plus the thickness of resin coating 12. The resin coating may have a thickness on the order of 3–4 mils and the wire diameter (including insulation) may be on the order of 7 mils. Under these circumstances, the height *h* would be on the order of 9 mils. When the tacking head moves to its lowermost position where the legs 34 of the tacking head contact the dielectric base 11, the conductor 14 is pushed part way into the resin coating.

The width *w* of the opening is somewhat greater than the diameter of the conductor 14. For a wire diameter of 7 mils, the width *w* of the U-shaped opening would be on the order of 10 mils. Preferably, the U-shaped opening is somewhat tapered so that the width is approximately 9.5 mils at the upper end and gradually increases to a width of approximately 11 mils at the lower portion. The inner edges of legs 34 are preferably rounded as is the upper portion of the U-shaped opening 22.

As the tacking head moves downwardly it contacts the coating 12 at points 35 as shown in FIG. 3 and begins to heat the resin coating. The resin becomes malleable and, therefore, further downward movement of the tacking head begins to build up the mounds 36 as the resin is forced upwardly around the conductor inside the U-shaped opening. When the tacking head reaches the full extended position with the legs 34 in contact with the dielectric base 11, the protrusions 37 are formed extending from the base upwardly around the conductor beyond the horizontal diameter.

Figure 3A:
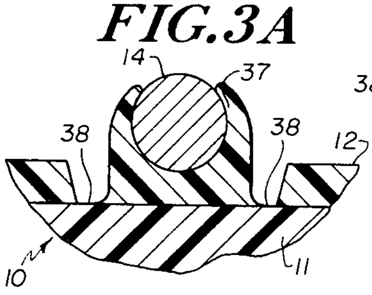
FIGS. 3A and 3B are cross-sectional and top views, respectively, of a completed tack.
Figure 3B:
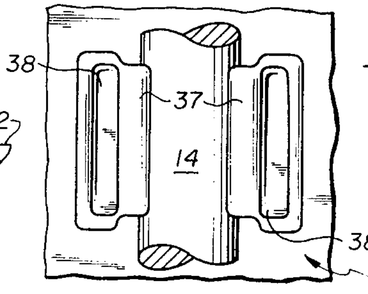

The completed tack appears as is shown in FIGS. 3A and 3B with the protrusions 37 extending upwardly and around the conductor to physically capture the conductor and thereby bond it to the base. Also, the conductor is largely surrounded by the thermosetting resin which has become adhesive when heated and, therefore, an adhesive bond exists between the conductor and the base. The depressions 38 are formed by the legs 34 of the tacking head when the resin material is forced upwardly to form the protrusions 37. Accordingly, as shown in FIGS. 3A and 3B, the conductor 14 is adhesively bonded to the base and is also captured and thereby physically bonded to the base.

Figure 4:
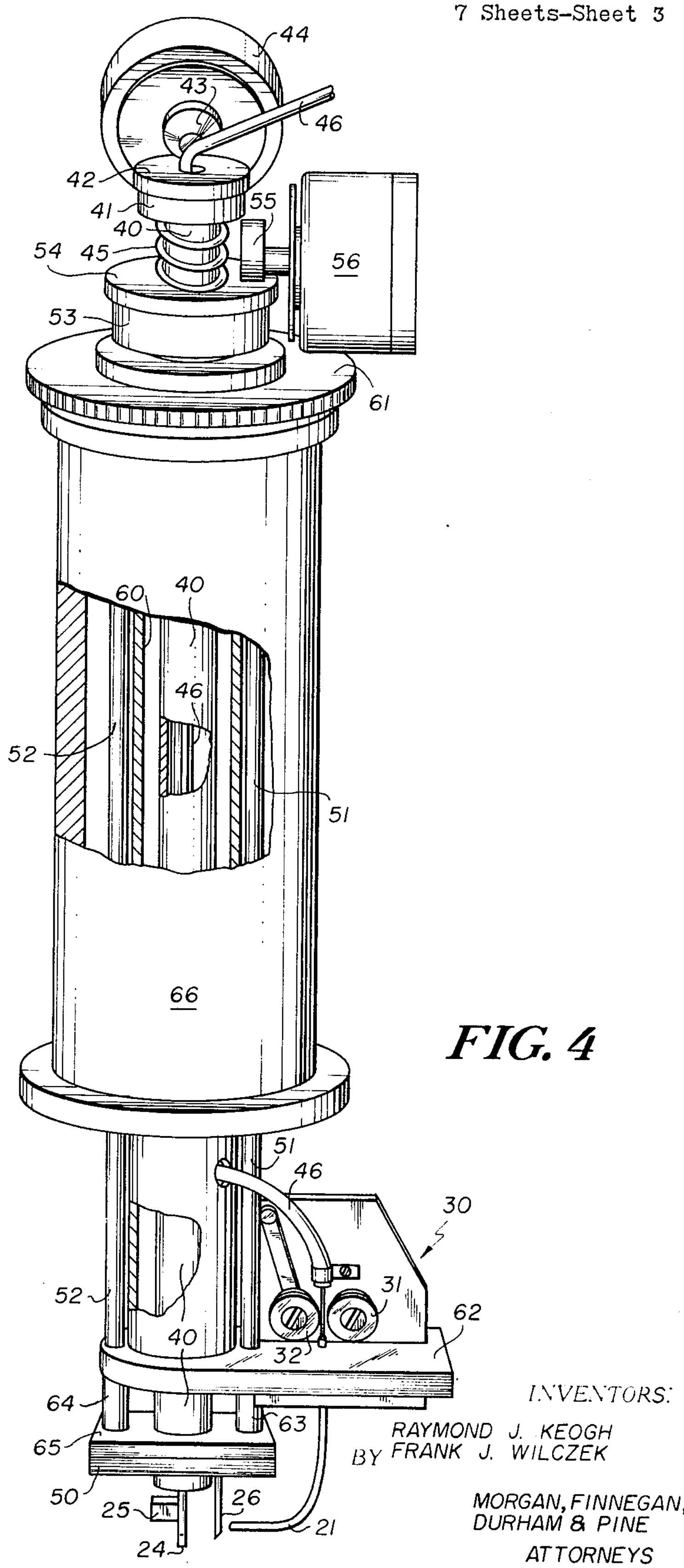
FIG. 4 is a more complete perspective illustration of the tacking apparatus with portions broken away for clarity of illustration.

In the formation of conductor patterns the wire is drawn through the wire guide beneath the tacking head by the movement of the table and therefore the assembly as shown in FIG. 2 is constructed so that it can be rotated through 360 degrees to provide wire feeding and tacking in any one of four directions corresponding to the four possible directions of movement. FIG. 4 is a simplified illustration showing the manner in which the tacking and feed mechanism are actuated while permitting the desired rotation of the tacking assembly.

Tacking head 24 and heater 25, are mounted at the lower end of a hollow shaft 40 having an end cap 41 and pressure ring 42 secured to the upper end. The pressure ring provides a cam follower surface for an eccentric cam 43 mounted on the shaft of a rotating solenoid 44. Shaft 40 is maintained in its normal retracted position by spring 45. When the solenoid is energized the solenoid shaft turns 90 degrees forcing shaft 40 downwardly to compress spring 45. When de-energized, the solenoid returns to the initial position due to a return spring in the solenoid and, hence, shaft 40 returns to the retracted position. Shaft 40 can rotate about its axis and cam 43 acts against the cam follower surface provided by pressure ring 42 regardless of the shaft position.

A Teflon tube 46 extends from the initial wire feed mechanism 30 up through the center of hollow shaft 40 and emerges through a center opening in end cap 41 and pressure ring 42. Therefore wire can be supplied to the feed mechanism through tube 46 in the center of the structure regardless of the angular position of the tacking assembly.

The cutter 26 is secured extending downwardly from the lower surface of a cutter plate 50. The cutter plate is secured to a pair of rods 51 and 52 which extend upwardly and are attached to a pressure cup 53 and pressure ring 54 at their upper ends. Pressure ring 54 provides a flat cam follower surface for an eccentric cam 55 mounted on the shaft of a rotary solenoid 56. When solenoid 56 is energized the associated cam roates 90 degrees and therefore forces the pressure ring and rods 51 and

52 downwardly against spring tension. As a result, cutter plate 50 and cutter 26 are momentarily force downwardly against the interconnection board to cut the wire.

A hollow cylinder 60 surrounds hollow shaft 40. A gear 61 is secured to the upper end of cylinder 60 and a feed mount 62 is secured to the lower end of cylinder 60 to support initial feed mechanism 30. Hollow spacers 63 and 64 secure a cutter mount 65 below the feed mount and rods 51 and 52, which are attached to the cutter and cutter plate, pass through the center of spacers 63 and 64 respectively. Shaft 40 attached to the tacking head passes through the center of cutter mount 65 and cutter plate 50.

Stationary cylinder 66 surrounds shaft 40, cylinder 60 and rods 51 and 52. As will be described hereafter in more detail, stationary cylinder 66 is securely mounted to support the tacking assembly. Rotational movement for the tacking assembly including the tacking head, cutter, and initial wire feed can be achieved through rotation of cylinder 60 by means of gear 61. Shaft 40 which actuates the tacking head 24 and rods 51 and 52 which actuate cutter 26 rotate with cylinder 60.

Figure 5:
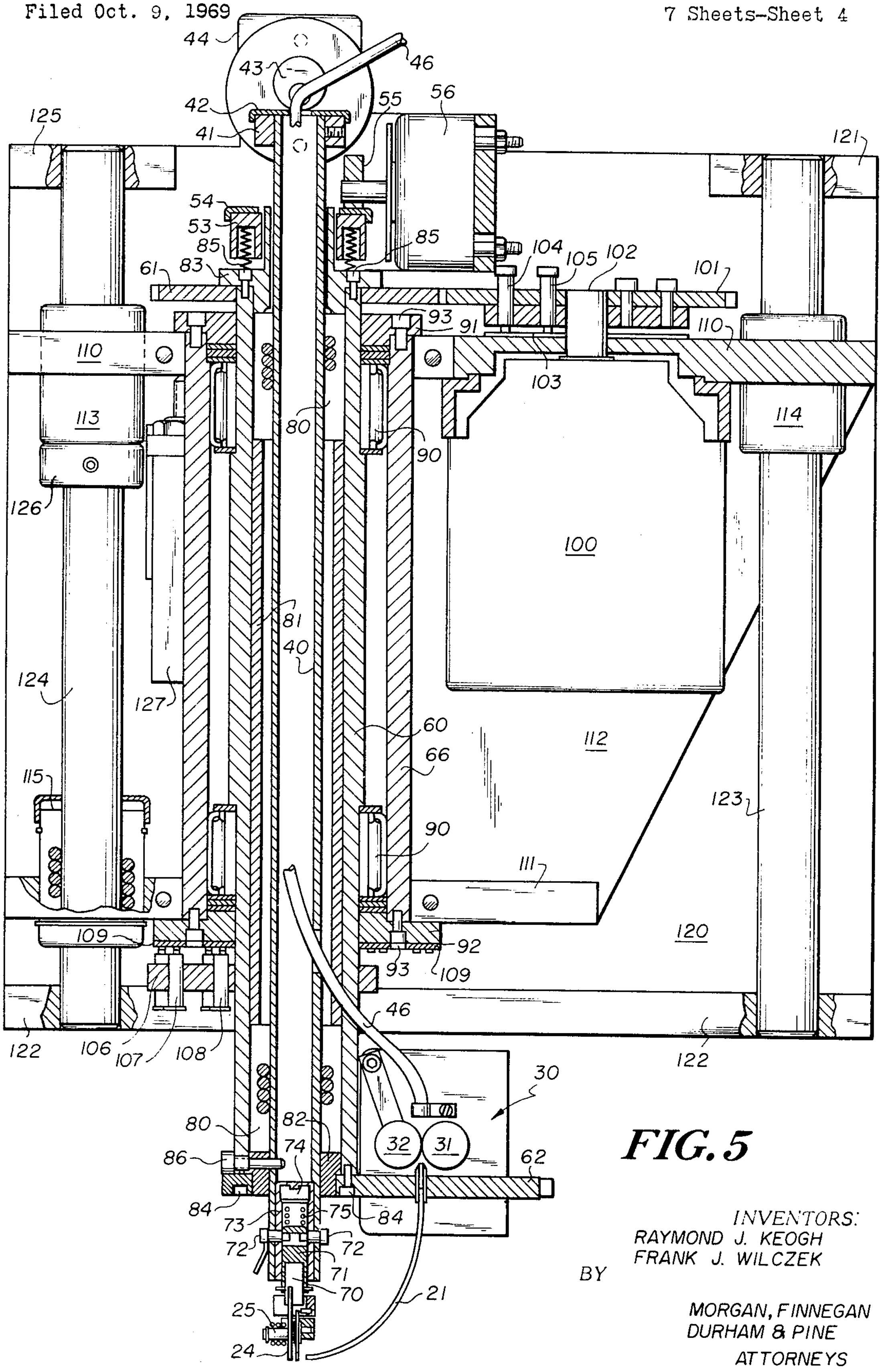
FIGS. 5 and 6 are front and side views, respectively of the complete tacking apparatus.
Figure 6:
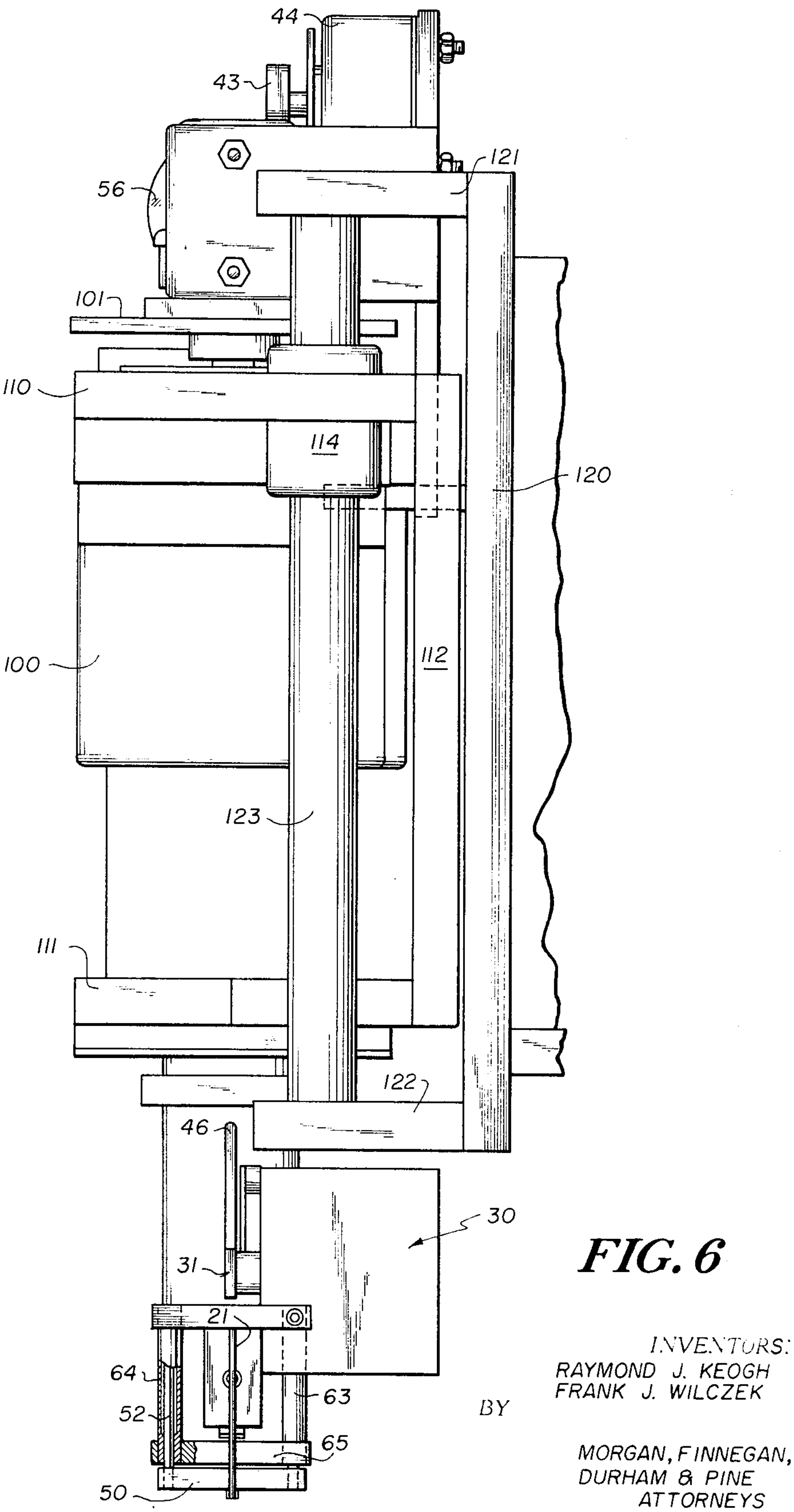

The complete tacking apparatus is shown in FIGS. 5 and 6 which are front and side views respectively.

The tacking head 24 is mounted in a heat insulating plastic base 70 which in turn is mounted in a pressure cup 71. A pair of guide pins 72 extend inwardly through the walls of shaft 40 and extend into an oval opening within pressure cup 71 to thereby permit movement of the tacking head relative to shaft 40. A guide cylinder 73 is secured within the enlarged opening at lower end of shaft 40 and a set screw 74 is threaded into the upper end of the guide cylinder. A spring 75 is located between the set screw and pressure cup 71 to urge the pressure cup to the extended position against guide pins 72. Contact of the tacking head against the interconnection board tends to urge the tacking head upwardly into shaft 40 and therefore the contact pressure of the tacking head against the interconnection board is controlled by spring 75 and the adjustment of set screw 74.

Shaft 40 is mounted within cylinder 60 to permit an up and down motion of the shaft relative to the cylinder. A pair of ball bushings 80 are located within cylinder 60 surrounding shaft 40. The bushings 80 are separated by a cylindrical spacer 81. The feed mount 62 is secured to the lower end of cylinder 60 by machine screws 84 and holds a bushing retainer 82 in place within the lower end of cylinder 60. Gear 61 is secured to the upper end of the cylinder by a hollow gear shaft 83 which is held in place at the upper end of the cylinder by screws 85. Gear shaft 83 extends into the upper end of cylinder 60 and provides an upper bushing retainer surface. A guide pin 86 is located near the bottom cylinder 60 and fits within an oval opening in the wall of shaft 40, to permit an up and down motion of shaft 40 relative to the cylinder but, at the same time to prevent rotational movement of the shaft relative to the cylinder.

Thus, when rotary solenoid 44 is actuated, cam 43 forces shaft 40 downwardly as permitted by bushings 80 and guide pin 86. When tacking head 24 engages the surface of the interconnection board, spring 75 is compressed thereby controlling the downward pressure applied through the tacking head.

The upwardly extending cylindrical portion of gear shaft 83 provides a centering guide for pressure cup 53 and pressure ring 54. Springs are located in suitable openings in the lower surface of pressure cup 53 and these springs bear against the horizontal surface of the gear shaft to maintain pressure cup 53 and pressure ring 54 in contact with cam 55. For convenience the rods 51 and 52 which extend between pressure cup 53 and cutter plate 50 are shown located within cylinder 60 in FIG. 4 whereas in the actual construction the rods pass through suitable grooves machined into the wall of cylinder 60. Also, in the actual structure, the rods 51 and 52 are preferably disposed front and back rather than at the sides as shown in FIG. 4.

The cylinder 60 includes a center increased diameter portion which provides shoulders for roller bearings 90 which permit rotation of cylinder 60 relative to the stationary outer cylinder 66. The roller bearings are maintained in place by end plates 91 and 92 which are secured to the upper and lower ends, respectively, by screws 93.

Rotational movement of cylinder 60 is controlled by a motor 100 having a gear 101 mounted on the motor shaft 102. Teeth of gear 101 engage and mesh with the teeth of gear 61 secured to rotating cylinder 60. A pair of brush holders 104 and 105 are mounted for rotation with gear 101 and maintain a pair of brushes in contact with a stationary switch plate 103 to provide position sensing for rotating cylinder 60. Four radial conductor bars (not shown) angularly spaced 90 degrees apart are located flush with the upper surface of the switch plate. When gear 101 is located in one of the four positions corresponding to the conductor bars, a circuit is completed between the brushes which is used to develop a feedback signal for positioning the rotating cylinder.

Two pairs of brush holders 107 and 108 are mounted in a brush holder plate 106 secured to the lower portion of cylinder 60. Brush holders 107 urge a pair of brushes into contact with a pair of annular slip rings on a circuit plate 109 secured to a stationary end plate 92. These stationary slip rings are energized and electrical energy is transferred to the brushes to energize heater 25 which rotates with the head assembly. Brush holders 108 similarly urge a pair of brushes into contact with another set of slip rings on circuit plate 109 to provide energization for initial feed mechanism 30.

The entire head assembly is movable vertically so that it can be moved up and out of the way when interconnection boards are being inserted or removed on the digital table below. Upper and lower clamping plates 110 and 111 extend horizontally from a base plate 112. Each clamping plate is a two-piece assembly which fits around and clamps stationary cylinder 66 when bolted together. Motor 100 is mounted on clamping plate 110. A pair of linear bearings 113 and 114 are mounted in plate 110 and another linear bearing 115 is mounted in plate 111.

A stand 120 for the assembly includes an upper bracket 121 and a lower bracket plate 122 which holds a vertical shaft 123 which cooperates with linear bearing 114. Another vertical bearing shaft 124 is secured between upper bracket 125 and lower bracket plate 122 and cooperates with linear bearings 113 and 115. Therefore, the entire assembly mounted on base plate 112 and clamping plates 110 and 111 can be moved up and down relative to the stand 120 as the linear bearings slide up and down on bearing shafts 123 and 124. An adjustable stop 126 secured to shaft 124 determines the lowermost position. An air cylinder 127 is utilized to raise the assembly.

Figures 7, 7A, 7B, 8:
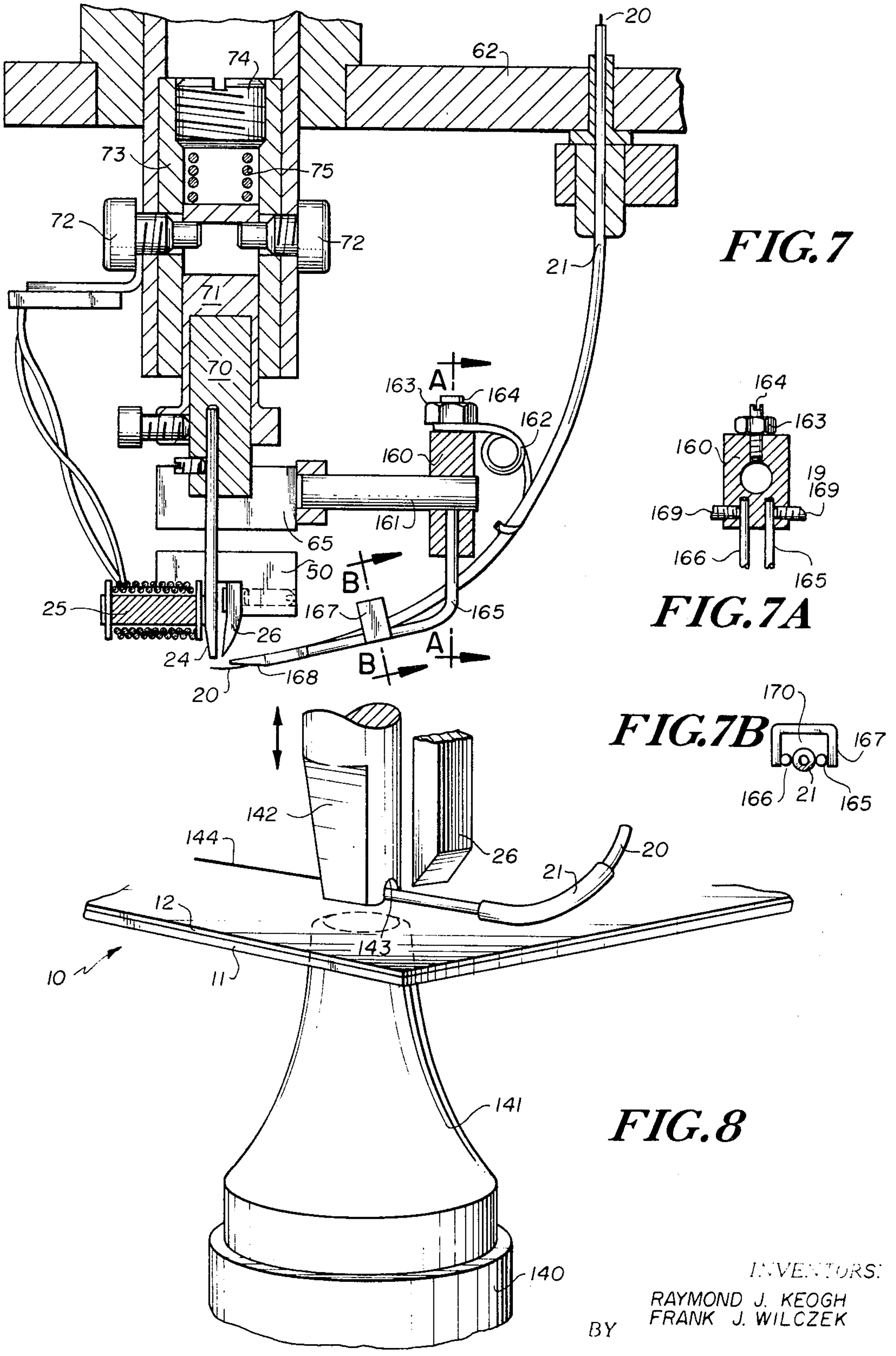
FIGS. 7, 7A and 7B are cross-sectional views showing details of the tacking head and the associated wire guide, FIGS. 7A and 7B being cross sections taken along lines A—A and B—B respectively.
FIG. 8 is a perspective illustration of an alternative tacking head structure incorporating an ultrasonic transducer.

In the foregoing illustrations the details of the wire guide have been omitted but are shown in FIGS. 7, 7A and 7B. The wire guide is designed to permit some up and down motion while maintaining contact with the surface of the interconnection board so that it can ride over conductors which may have been previously secured to the surface of the board. At the same time however, lateral movement of the wire guide is substantially eliminated so that bends in the wire can be formed accurately and the wire is maintained in accurate alignment with the U-shaped opening in tacking head 24.

A guide mount 160 is secured to the cutter mount 65 by means of a rod 161. A support spring 162 at one end is wrapped around a stud 164 and held in place by a nut 163, the free end of the support spring being looped around wire guide 21. Guide arms 165 and 166 are secured in suitable apertures in the guide block by set screws 169 and extend downwardly and toward the tacking head. The laterally extending portions of guide arms 165 and 166 are maintained on opposite sides of wire guide 21 by a U-shaped bracket 167 held in place with epoxy cement 170.

The end of wire guide 21 is cut on a diagonal at 168 to generally conform to the surface plane of the interconnection board. The end of the wire guide can move up and down due to the flexibility of the wire guide and the relative freedom of movement in this direction between guide arms 165 and 166. The guide arms however act as restraints which preclude any significant lateral movement.

An alternative tacking head structure is shown in FIG. 8 wherein an ultrasonic transducer 140 is used in place of heater 25. The transducer is of conventional design and is energized from a suitable high frequency source, e.g., 20,000 kilohertz. The ultrasonic energy is coupled to the adhesive layer 12 and tacking head 142 through a titanium horn 141 to thereby locally heat layer 12 in the vicinity of the tacking head to the desired malleabe and adhesive state. This tacking head structure is particularly advantageous where generally continuous tacks 144 covering substantial portions of the conductor run are desired. Tacking head 142 is dimensioned similar to tacking head 24 (FIG. 2), although, when used for continuous tacking operations, the U-shaped opening 143 is preferably flared outwardly and rounded at the leading edges adjacent cutter 26. The remainder of the tacking assembly is essentially the same as previously described.

Figure 9:
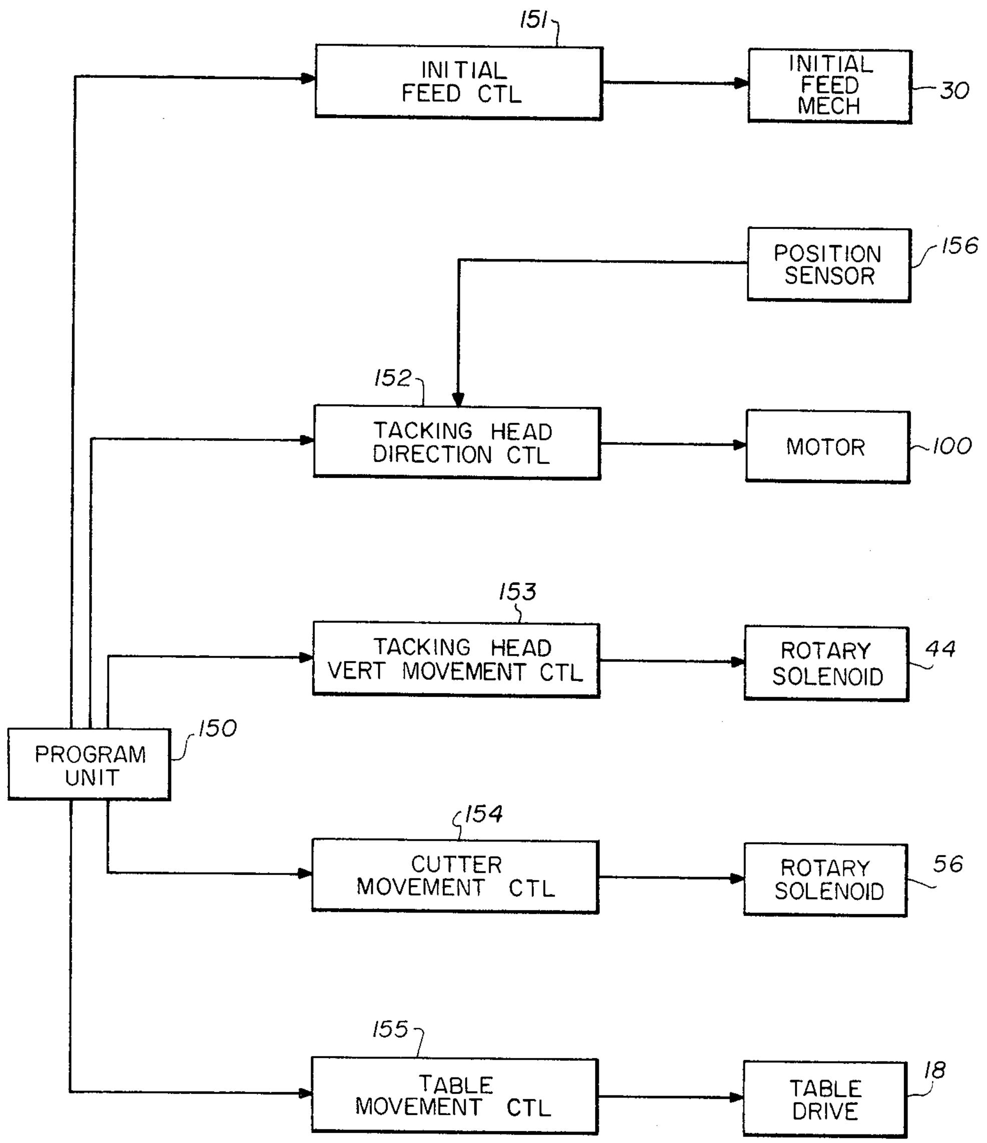
FIG. 9 is a block diagram of the control system for the tacking apparatus.

The tacking apparatus shown in FIGS. 2–7 is controlled digitally according to a program on magnetic tape, paper tape, punch cards or the like which are supplied to a program unit 150 shown in FIG. 9. Control units 151–155 operate in accordance with the program to control, respectively, initial feed mechanism 30, motor 100, rotary solenoids 44 and 56, and table drive 18. Position data for tacking head direction control unit 152 is developed by a position sensor 156 including the brushes associated with brush holders 104, 105 and switch plate 103 (FIG. 5).

In a typical sequence of operations the program unit first sends instructions to table movement control unit 155 which in turn positions table 17 (FIG. 2) by means of table drive 18 at the initial position for a conductor run. Instructions are also sent to tacking head direction control unit 152 to operate motor 100 and thereby orient the tacking apparatus in the proper direction for the forthcoming conductor run. Next, the initial feed control unit 151 receives instructions to actuate initial feed mechanism 30 to advance the wire so the free end is located beneath the tacking head. When this is accomplished rotary cam 44 is energized via tacking head vertical movement control unit 153 to tack the free end of the wire to substrate 10 (FIG. 2).

Once the free end of the wire is secured, movement of the table pulls the wire past the tacking head. Instructions are sent alternately to table movement control unit 155 to provide incremental movements and to tacking head vertical movement control unit 153 to tack the conductor to the substrate between successive incremental movements. If it is desired to change direction during a conductor run, tacking head directional control unit 152 is activated following a tack to bend the wire 90 degrees and to orient the tacking assembly for the next set of incremental movements.

Cutter movement control unit 154 receives instructions to energize rotary solenoid 56 after the last tack of a conductor run has been completed. The sequence of operations is then repeated for other conductor runs.

If a tacking head such as shown in FIG. 8 is used to provide continuous tacks, the program would be similar except that tacking head vertical movement control unit 153 would be arranged to maintain the tacking head in the down position during straight portions of the conductor runs and raised only when changing direction or after completion of a conductor run.

Although ony a few embodiments have been described in detail it should be obvious that there are numerous variations within the scope of this invention. The system need not be confined to orthogonal conductor patterns and could, for example, be designed to produce conductor patterns with 45 degree bends in the conductors as well as 90 degree bends. The invention is more particularly defined in the appended claims.

What is claimed is:

1. Apparatus for tacking insulated wire to a dielectric base comprising a tacking head having a bifurcated end forming an inverted U-shaped opening with extending legs for straddling the wire to be tacked;

means on said legs for contacting said dielectric base at the opposite sides of the wire straddled in said U-shaped opening as said tacking head is moved into tacking engagement with said dielectric base;

wire feed means for feeding insulated wire between said tacking head and said dielectric base;

means for supporting the dielectric base;

means for moving said tacking head into tacking engagement with said dielectric base supported on said supporting means;

means coupled to said tacking head for locally heating the surface of the dielectric base under said tacking head and at the opposite sides of the wire as said tacking head is moved into tacking engagement with said dielectric base; and means for creating relative movement between said tacking head and said dielectric base so that the insulated wire is tacked to the dielectric base according to a predetermined conductor pattern.

2. Apparatus according to claim 1 wherein said means supporting the dielectric base is a movable table and wherein said means for creating relative movement is a programable means for controlling movement of said movable table according to a predetermining program of movement.

3. Apparatus according to claim 1 wherein said means coupled to said tacking head for locally heating the surface of the dielectric base is a heating coil thermally coupled to said tacking head.

4. Apparatus according to claim 1 wherein said means coupled to said tacking head for locally heating the surface of the dielectric base is an ultrasonic transducer acoustically coupled to said tacking head.

5. Apparatus according to claim 1 further including a cutter adjacent said tacking head for cutting the insulated wire after each conductor run of said conductor pattern.

6. Apparatus according to claim 5 further including a digital control means operating according to a predetermined digital program, said control means being operative to (a) control the movement of the dielectric base relative to said tacking head (b) control the movement of said tacking head and (c) control the operation of said cutter.

7. Apparatus according to claim 1 wherein said means for supporting the dielectric base is a horizontal movable table and wherein said tacking head is movable downwardly into contact with the dielectric base and is rotatable according to the direction of movement of said table.

8. Apparatus for tacking wire to a dielectric base coated with a thermosetting resin comprising a tacking head;

means for heating said tacking head to a temperature sufficient to place the resin in a malleable state;

said tacking head including a bifurcated end to provide an inverted U-shaped opening adapted to straddle the wire being tacked and being dimensioned in accordance with the wire diameter and resin coating thickness, the height of the U-shaped opening being less than the wire diameter plus the resin coating thickness and the width of the U-shaped opening being greater than the wire diameter so that when said tacking head is urged toward the dielectric base, the resin is forced upwardly within said U-shaped opening around said wire; and means for moving said tacking head downwardly to locally heat the thermosetting resin and to mold the same to at least partially capture the wire.

9. The apparatus according to claim 8 further including a wire cutter located adjacent said tacking head.

10. The apparatus according to claim 8 wherein said wire feed means includes an initial wire feed mechanism for feeding the end of a conductor beneath said tacking head and thereafter permitting free passage of the wire while the wire is being tacked to the dielectric surface.

11. Apparatus for tacking wire to a dielectric base coated with a thermosetting resin comprising a tacking head;

an ultrasonic transducer acoustically coupled to said tacking head to convey ultrasonic energy to said thermosetting resin to locally heat the same to a malleable adhesive state;

wire feed means for feeding wire to be tacked beneath said tacking head;

said tacking head including an opening adapted to straddle the wire being tacked, said opening having extending legs for straddling the wire to be tacked and for contacting the thermosetting resin coating on said dielectric base at the opposite sides of the wire straddled in said opening as said tacking head is moved into engagement with the dielectric base and for forcing said thermosetting resin heated to a malleable adhesive state upwardly and around said wire; and means for moving said tacking head into engagement with the dielectric base and for moving the dielectric base relative to said tacking head so that wire is dispensed and tacked to the dielectric base according to a predetermined conductor pattern.

References Cited

UNITED STATES PATENTS

| | | | |
|---|---|---|---|
| 3,470,612 | 10/1969 | Helms | 174—685 X |
| 3,526,554 | 9/1970 | Obeda | 156—73 |
| 3,558,407 | 1/1971 | Ballard et al. | 156—580 |
| 3,053,124 | 9/1962 | Balamuth et al. | 228—1 |

OTHER REFERENCES

V. T. H. and S. E. Nichols, Jr., Ultrasonic Bonding Tip, IBM Technical Disclosure Bulletin, vol. 10, No. 12, May 1968.

BENJAMIN A. BORCHELT, Primary Examiner

H. J. TUDOR, Assistant Examiner

U.S. Cl. X.R.

156—73, 583